(12) United States Patent
Asterjadhi et al.

(10) Patent No.: US 9,998,209 B2
(45) Date of Patent: Jun. 12, 2018

(54) SPEED FRAME EXCHANGE RULES

(71) Applicant: QUALCOMM Incorporated, San Diego, CA (US)

(72) Inventors: Alfred Asterjadhi, San Diego, CA (US); Amin Jafarian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 14/472,019

(22) Filed: Aug. 28, 2014

(65) Prior Publication Data

US 2015/0063210 A1 Mar. 5, 2015

Related U.S. Application Data

(60) Provisional application No. 61/872,721, filed on Sep. 1, 2013, provisional application No. 61/872,706, filed on Aug. 31, 2013.

(51) Int. Cl.
*H04B 7/26* (2006.01)
*H04L 12/931* (2013.01)
*H04W 52/02* (2009.01)

(52) U.S. Cl.
CPC .............. *H04B 7/26* (2013.01); *H04L 49/20* (2013.01); *H04W 52/0216* (2013.01); *Y02D 70/00* (2018.01); *Y02D 70/142* (2018.01); *Y02D 70/164* (2018.01); *Y02D 70/449* (2018.01)

(58) Field of Classification Search
CPC ................ H04L 1/1671; H04L 1/1854; H04L 2001/0093; H04L 5/0055
See application file for complete search history.

(56) References Cited

U.S. PATENT DOCUMENTS

| | | | |
|---|---|---|---|
| 6,845,089 B1* | 1/2005 | Gu | H04L 1/16 370/329 |
| 2005/0165946 A1* | 7/2005 | Stephens | H04W 28/26 709/233 |
| 2007/0298742 A1* | 12/2007 | Ketchum | H04B 7/0617 455/186.1 |
| 2008/0146253 A1 | 6/2008 | Wentink | |
| 2011/0205968 A1* | 8/2011 | Kim | H04W 72/085 370/328 |

(Continued)

OTHER PUBLICATIONS

International Search Report and Written Opinion—PCT/US2014/053340—ISA/EPO—dated Dec. 4, 2014.

(Continued)

*Primary Examiner* — Romani Ohri
(74) *Attorney, Agent, or Firm* — Patterson & Sheridan, LLP

(57) ABSTRACT

Certain aspects of the present disclosure provide methods and apparatus that may determine operation for speed frame exchange. According to certain aspects, a method for wireless communications by an apparatus is provided. The operations may be performed by a station, for example, by an access point initiating a speed frame exchange. The method generally includes indicating, via a value of at least one bit of a field of a frame of a sequence of frames being exchanged between the apparatus and a device, whether the apparatus is initiating a subsequent exchange of a sequence of frames, and transmitting the frame to the device.

22 Claims, 9 Drawing Sheets

(56) References Cited

U.S. PATENT DOCUMENTS

2013/0301569 A1* 11/2013 Wang .................... H04L 5/0055
370/329
2013/0329658 A1* 12/2013 Liu ....................... H04W 74/02
370/329

OTHER PUBLICATIONS

Park M, "TGah-SFD-D14.x ; 11-13-0599-00-00-ah-tgah-sfd-d14-x", IEEE SA Mentor; 11-13-0599-00-00AH-TGAH-SFD-D14-X, IEEE-SA Mentor, Piscataway, NJ USA, vol. 802.11ah, May 15, 2013 (May 15, 2013), pp. 1-76, XP068054133, [retrieved on May 15, 2013] p. 21.

* cited by examiner

SPEED FRAME EXCHANGE RULES

CROSS-REFERENCE TO RELATED APPLICATION(S)

This application claims benefit of U.S. Provisional Patent Application Ser. No. 61/872,706, filed Aug. 31, 2013, which is herein incorporated by reference in its entirety, and U.S. Provisional Patent Application Ser. No. 61/872,721, filed Sep. 1, 2013, which is herein incorporated by reference in its entirety.

BACKGROUND

I. Field of the Disclosure

Certain aspects of the present disclosure generally relate to wireless communications and, more particularly, to rules related to speed frame exchanges.

II. Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provided techniques and apparatus for speed frame exchanges.

Aspects of the present disclosure provide an apparatus for wireless communications. The apparatus generally includes a processing system configured to indicate, via a value of at least one bit of a field of a frame of a sequence of frames being exchanged between the apparatus and a device, whether the apparatus is initiating a subsequent exchange of a sequence of frames, and a transmitter configured to transmit the frame to the device.

Aspects of the present disclosure provide a method for wireless communications. The method generally includes indicating, via a value of at least one bit of a field of a frame of a sequence of frames being exchanged between the apparatus and a device, whether the apparatus is initiating a subsequent exchange of a sequence of frames, and transmitting the frame to the device.

Aspects of the present disclosure provide an apparatus for wireless communications. The apparatus generally includes means for indicating, via a value of at least one bit of a field of a frame of a sequence of frames being exchanged between the apparatus and a device, whether the apparatus is initiating a subsequent exchange of a sequence of frames, and means for transmitting the frame to the device.

Aspects of the present disclosure provide a computer program product for wireless communications having a computer readable medium with instructions stored thereon. The instructions generally include instructions for indicating, via a value of at least one bit of a field of a frame of a sequence of frames being exchanged between the apparatus and a device, whether the apparatus is initiating a subsequent exchange of a sequence of frames, and transmitting the frame to the device.

Aspects of the present disclosure provide an access point (AP). The AP generally includes at least one antenna; a processing system configured to indicate, via a value of at least one bit of a field of a frame of a sequence of frames being exchanged between the AP and a device, whether the AP is initiating a subsequent exchange of a sequence of frames; and a transmitter configured to transmit the frame, via the at least one antenna, to the device.

Aspects of the present disclosure provide an apparatus for wireless communications. The apparatus generally includes a receiver configured to receive a frame of a sequence of frames being exchanged between the apparatus and a device, and a processing system configured to determine, via a value of at least one bit of a field of the frame, whether the device is initiating a subsequent exchange of a sequence of frames.

Aspects of the present disclosure provide a method for wireless communications. The method generally includes receiving a frame of a sequence of frames being exchanged between the apparatus and a device and determining, via a value of at least one bit of a field of the frame, whether the device is initiating a subsequent exchange of a sequence of frames.

Aspects of the present disclosure provide an apparatus for wireless communications. The apparatus generally includes means for receiving a frame of a sequence of frames being exchanged between the apparatus and a device and means for determining, via a value of at least one bit of a field of the frame, whether the device is initiating a subsequent exchange of a sequence of frames.

Aspects of the present disclosure provide a computer program product for wireless communications having a computer readable medium with instructions stored thereon. The instructions generally include instructions for receiving a frame of a sequence of frames being exchanged between the apparatus and a device and determining, via a value of at least one bit of a field of the frame, whether the device is initiating a subsequent exchange of a sequence of frames.

Aspects of the present disclosure provide a user terminal (UT). The UT generally includes at least one antenna; a receiver configured to receive, via the at least antenna, a frame of a sequence of frames being exchanged between the UT and a device; and a processing system configured to determine, via a value of at least one bit of a field of the frame, whether the device is initiating a subsequent exchange of a sequence of frames.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
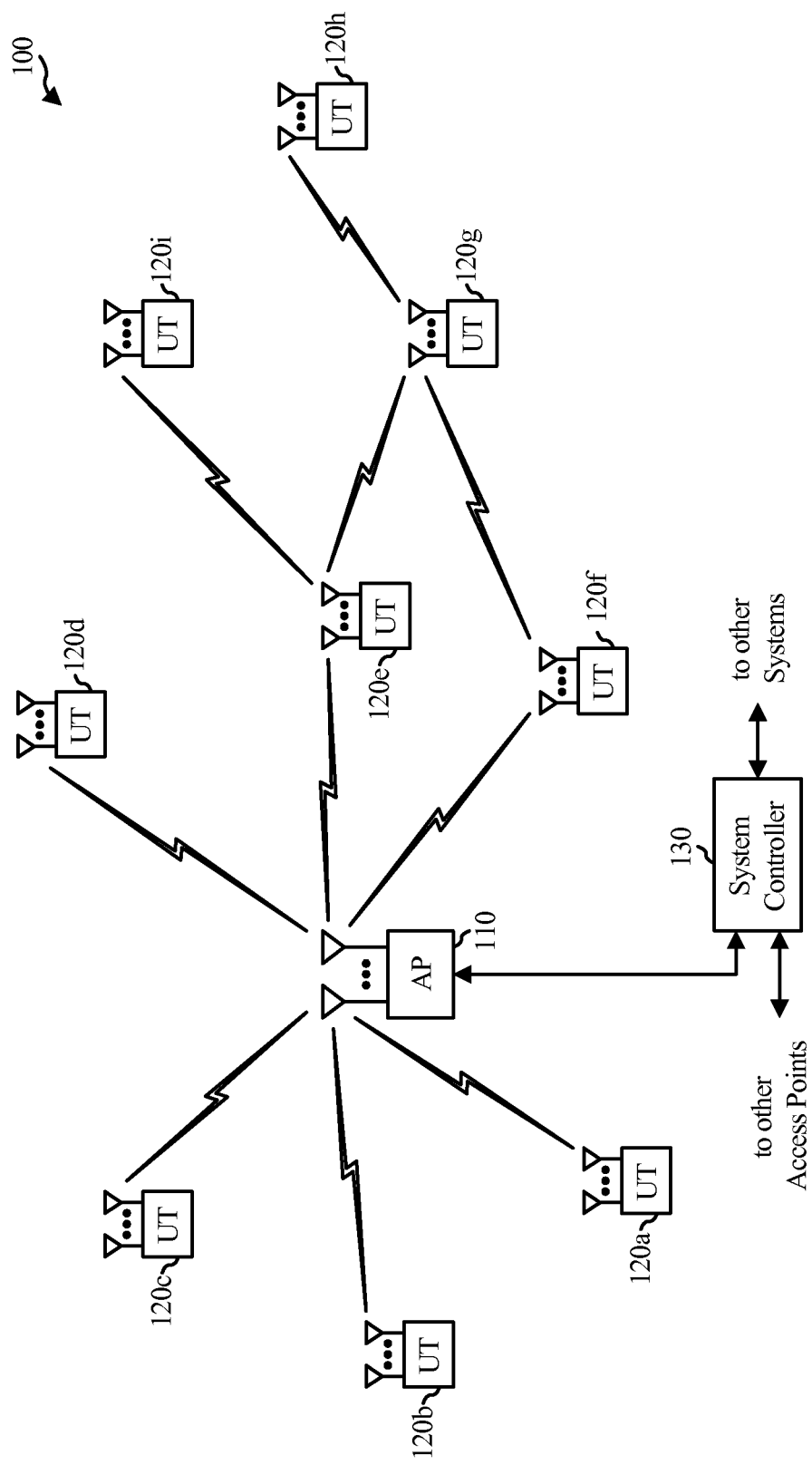
FIG. 1 illustrates a diagram of an example wireless communications network, in accordance with certain aspects of the present disclosure.

Certain aspects of the present disclosure provided techniques and apparatus for speed frame exchanges and rules related to speed frame exchanges.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The acronyms listed below may be used herein, consistent with commonly recognized usages in the field of wireless communications. Other acronyms may also be used herein, and if not defined in the list below, are defined where first appearing herein.

ACK . . . Acknowledgement
A-MPDU . . . Aggregated Media Access Control Protocol Data Unit
AP . . . Access Point
BA . . . Block ACK
BAR . . . Block ACK Request
CRC . . . Cyclic Redundancy Check
DIFS . . . Distributed Interframe Space
EOF . . . End of Frame
EIFS . . . Extended Interframe Space
FCS . . . Frame Check Sequence
ID . . . Identifier
IEEE . . . Institute of Electrical and Electronic Engineers
LTF . . . Long Training Field
MAC . . . Media Access Control
MSB . . . Most Significant Bit
MIMO . . . Multiple Input Multiple Output
MPDU . . . MAC Protocol Data Unit
MU . . . Multi-User
MU-MIMO . . . Multi-User Multiple Input Multiple Output
NDP . . . Null Data Packet
OFDM . . . Orthogonal Frequency Division Modulation
OFDMA . . . Orthogonal Frequency Division Multiple Access
PHY . . . Physical Layer
PLCP . . . Physical Layer Convergence Protocol
PPDU . . . PLCP Protocol Data Unit
PSDU . . . PLCP Service Data Unit
QoS . . . Quality of Service
RDG . . . Reverse Direction Grant
SDMA . . . Spatial-Division Multiple Access
SIFS . . . Short Interframe Space
SIG . . . Signal (e.g., Sub 1 GHz)
STA . . . Station
STBC . . . Space-Time Block Coding
STF . . . Short Training Field
SU . . . Single User
TCP . . . Transmission Control Protocol
VHT . . . Very High Throughput
WLAN . . . Wireless Local Area Network The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The MIMO system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The MIMO system 100 may also be a TDMA system if the user terminals 120 share the same frequency channel by dividing transmission/reception into different time slots, each time slot being assigned to different user terminal 120.

Figure 2:
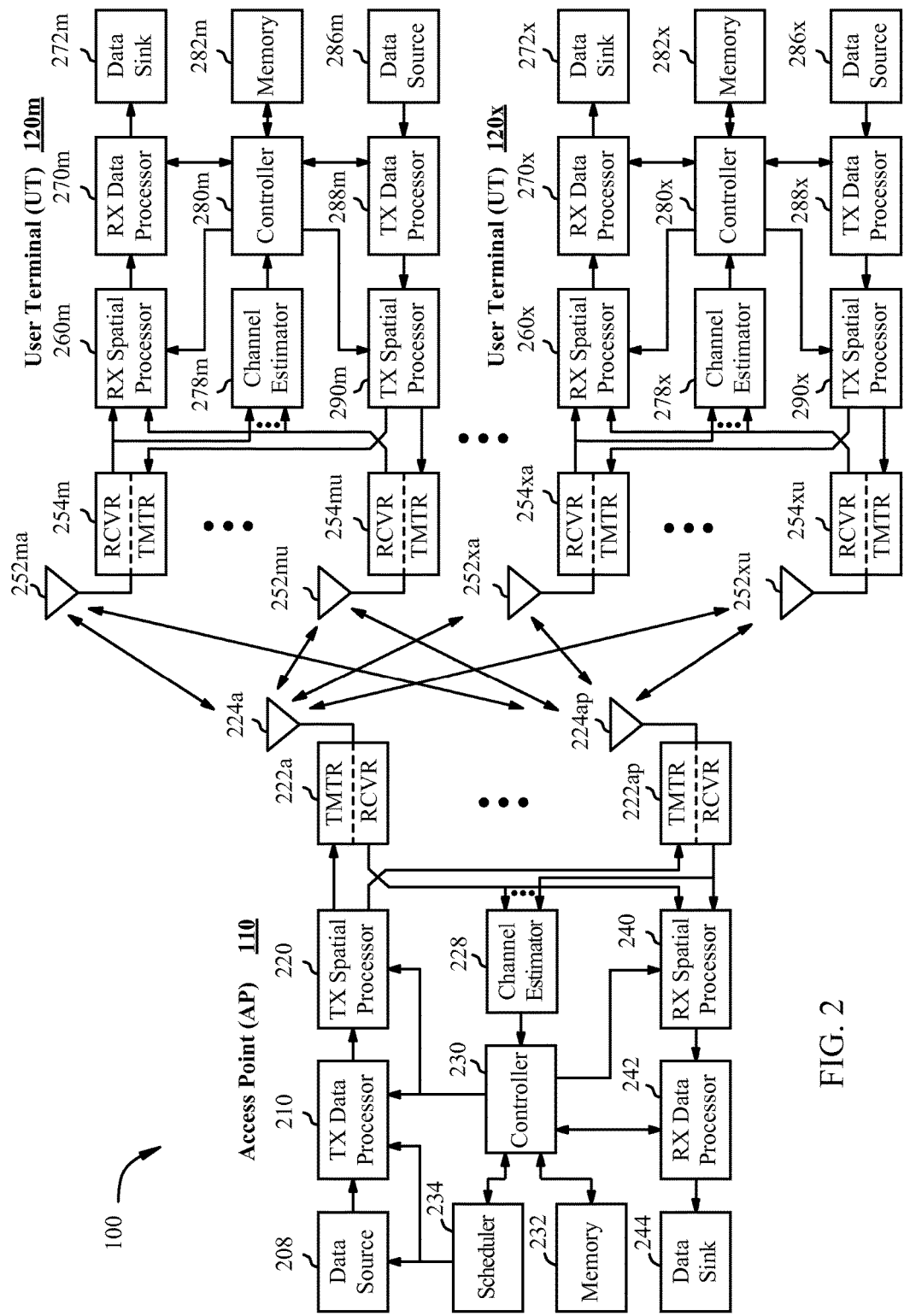
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
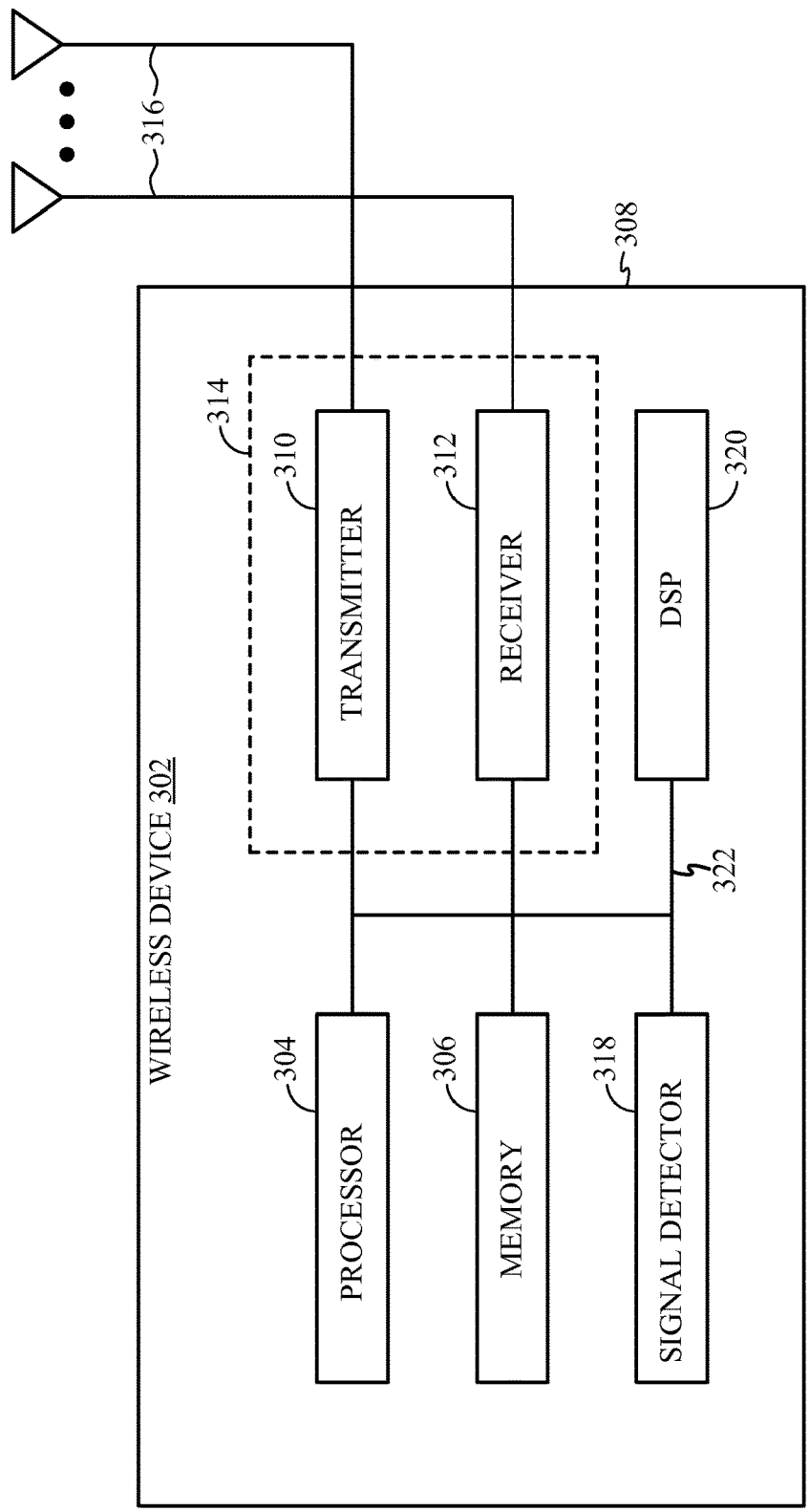
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Speed Frame Exchange

Aspects of the present disclosure provide solutions which may allow for differentiation of frames to be used in a speed frame (SF) exchange mechanism (also referred to as a bidirectional transmission opportunity (BDT)) and may also provide rules for speed frame operation.

Speed frame exchange generally allows devices (e.g., a sub 1 GHz (S1G) access point (AP) and a S1G non-AP station (STA)) to exchange a sequence of uplink and downlink physical layer convergence procedure (PLCP) protocol data units (PPDUs) separated by short inter-frame space (SIFS) time. SF exchange operation may combine both uplink and downlink channel access into a continuous frame exchange sequence between a pair of such devices (e.g., S1G STAs).

Figure 4:
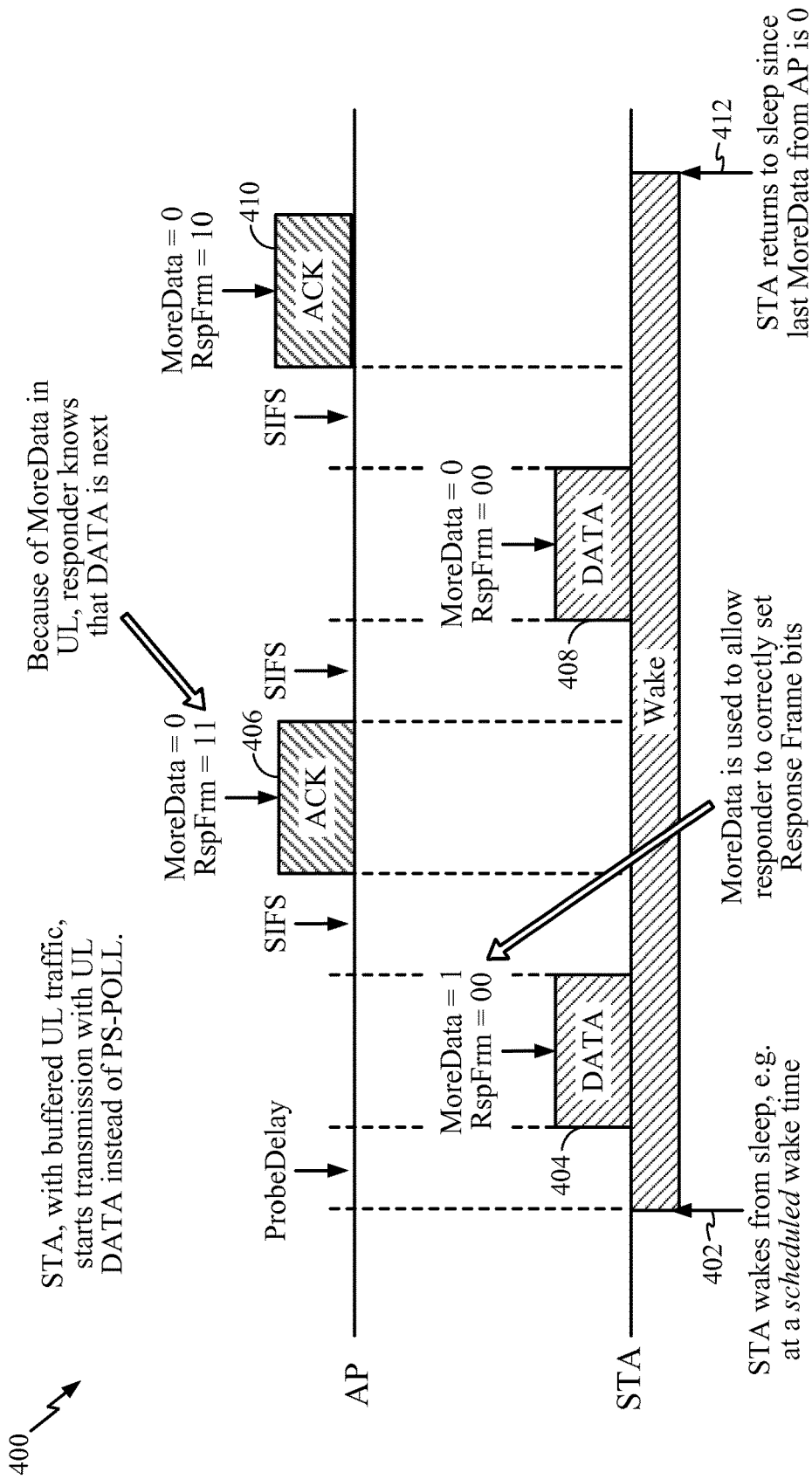
FIGS. 4-6 illustrate examples of speed frame exchange.
Figure 5:
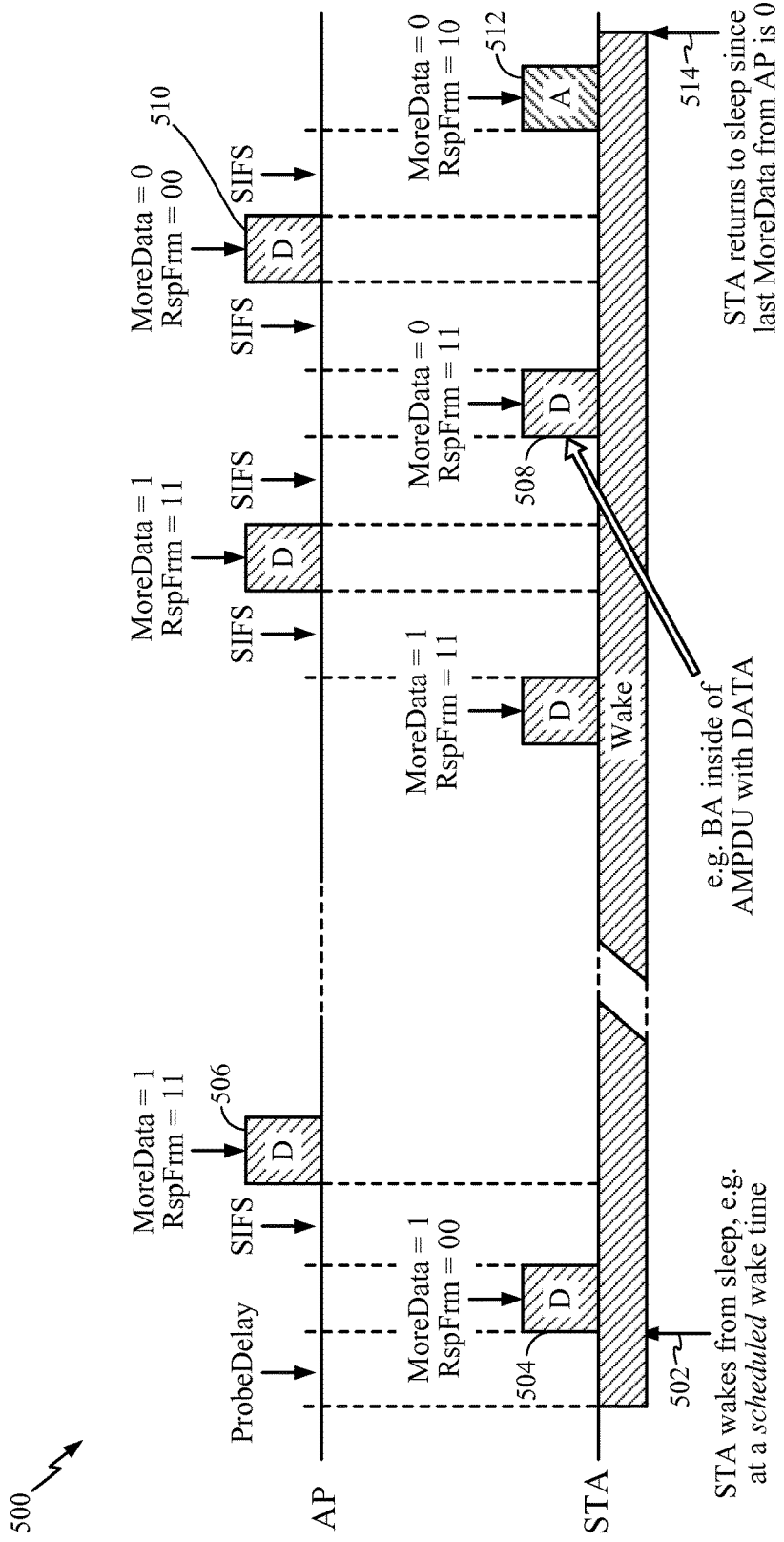
Figure 6:
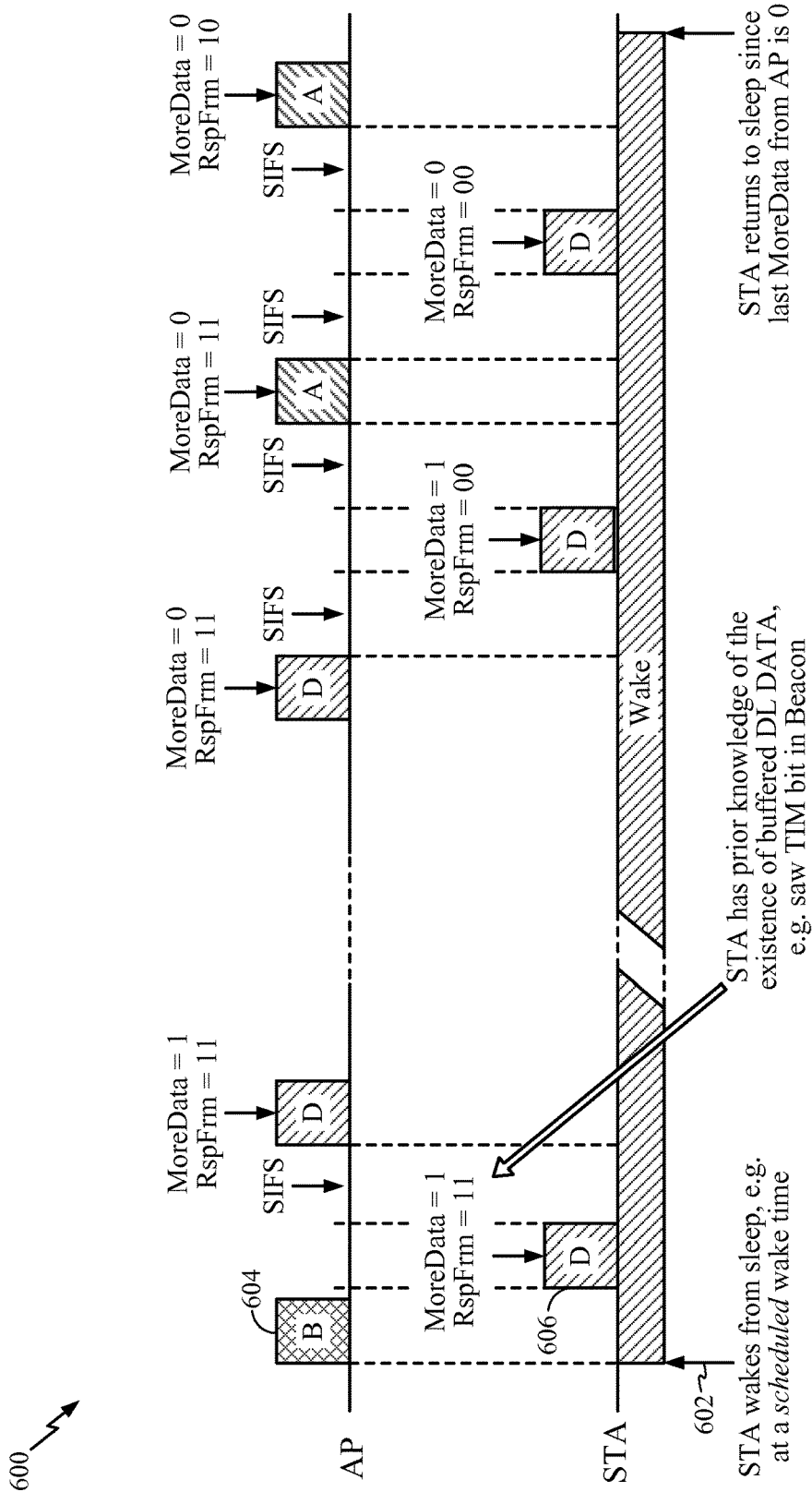

FIGS. 4-6 illustrate examples of speed frame exchange. If a STA has buffered UL traffic, as shown in FIG. 4 it may start speed frame exchange 400 to the AP with UL data, instead of PS-POLL (supported by unscheduled automatic power save delivery (U-APSD)). For example, as illustrated in FIG. 4, at 402 the STA may awake from sleep (e.g., at a scheduled wake up time). After a probe delay, at 404, the STA may UL DATA. According to certain aspects, the UL data may include a MoreData bit that is used to allow the AP to correctly set response frame bits. For example, the MoreData bit may be set to one to indicate that the STA has more data to send. After SIFS time, the AP may respond by sending an acknowledgment (ACK) to the STA, at 406. The AP may know, based on the received MoreData, that more data is expected from the STA. After another SIFS time, the STA may additional UL data to the AP, at 408. If the STA has no more data to send, the AP may set the MoreData to 0. At 410, after a SIFS time, the AP may send another ACK. At 412, the STA may return to sleep.

As illustrated in FIGS. 5 and 6, if the AP also has DL data to send to the STA, then instead of the AP returning an ACK to the STA, the AP may send the buffered DL data. For example, in the frame exchange 500 illustrated in FIG. 5, at 502, the STA may awaken from sleep (e.g., at a scheduled wake up time). As in speed frame exchange 400, the STA may send UL data at 504 to the AP and the UL data may include a MoreData bit set to 1 to indicate that the STA has additional data to send. In this case, the AP may have DL data to send to the STA and, after a SIFS time, may respond, at 506, by sending the DL data to the STA instead of an ACK. The DL data may include a MoreData bit set to 1 to indicate that the AP has additional data to send to the STA. According to certain aspects, when the STA send the last data it has to send to the AP, at 508, the MoreData bit may be set to 0 to indicate it to the AP. At 510, the AP may send its last DL data and set the MoreData to 0 to indicate it to the STA. At 512, the STA may send an ACK and then, at 514, the STA may return to sleep since the last DL data was delivered (e.g., as indicated by MoreData from AP set to 0).

In some cases, although the AP does not return an ACK, the presence of a next DATA frame indicates the previous frame was successful (e.g., implicit ACK). In some cases, a block acknowledgment (BA) may be combined with the data (e.g., inside of an aggregate medium access control (MAC) PDU (A-MPDU)).

As shown in the frame exchange 600 illustrated in FIG. 6, after waking up, at 602, the STA may receive a beacon from the AP, at 604. The beacon may include a traffic indication map (TIM) bit. Based on the TIM bit, the STA may know that the AP has DL data to send (even though the STA has not received a MoreData bit), and thus may set its ResponseFrame bit accordingly when it sends UL data at 606.

According to certain aspects, STAs (e.g., AP or non-AP) that participate in a SF exchange (e.g., SF exchange 400, SF exchange 500, or SF exchange 600 illustrated in FIGS. 4-6, respectively) may use information that is present in the Frame Control field, PLCP Header Signal field, and null data packet (NDP) MAC frames to signal an undergoing SF exchange, for example, according to certain rules for the SF exchange. SF exchange may minimize the number of contention-based channel accesses, improve channel efficiency by reducing the number of frame exchanges, and reduce STA power consumption by shortening awake times.

According to certain aspects, SF exchange may be initiated by a frame that carries a Response Indication of Long Response. According to certain aspects, the frame may be a quality of service (QoS) Data MPDU with the ACK policy field equal to any value, a Short Data MPDU with the ACK policy field equal to any value, a (Short) Management frame, a BlockAckReq frame related to a high throughput (HT) immediate Block Ack agreement, a PS-Poll frame, a Trigger frame, or a NDP Modified ACK.

According to certain aspects, a Response Indication of Long Response (e.g., relative to a duration of a normal response) may be signaled by setting the TXVECTOR's parameter RESPONSE_ INDICATION to Long Response for non-NDP frames and by setting the Duration Indication field to 1 and the Duration field to 1 for an NDP (Modified) ACK.

According to certain aspects, a Response Indication of No Response may be signaled by setting the TXVECTOR's parameter RESPONSE_ INDICATION to No Response for non-NDP frames and by setting the Duration Indication field to 1 and the Duration field to 0 for NDP (Modified) ACK. According to certain aspects, the reception of NDP BlockAck may be an implicit indication of No Response.

Figure 7:
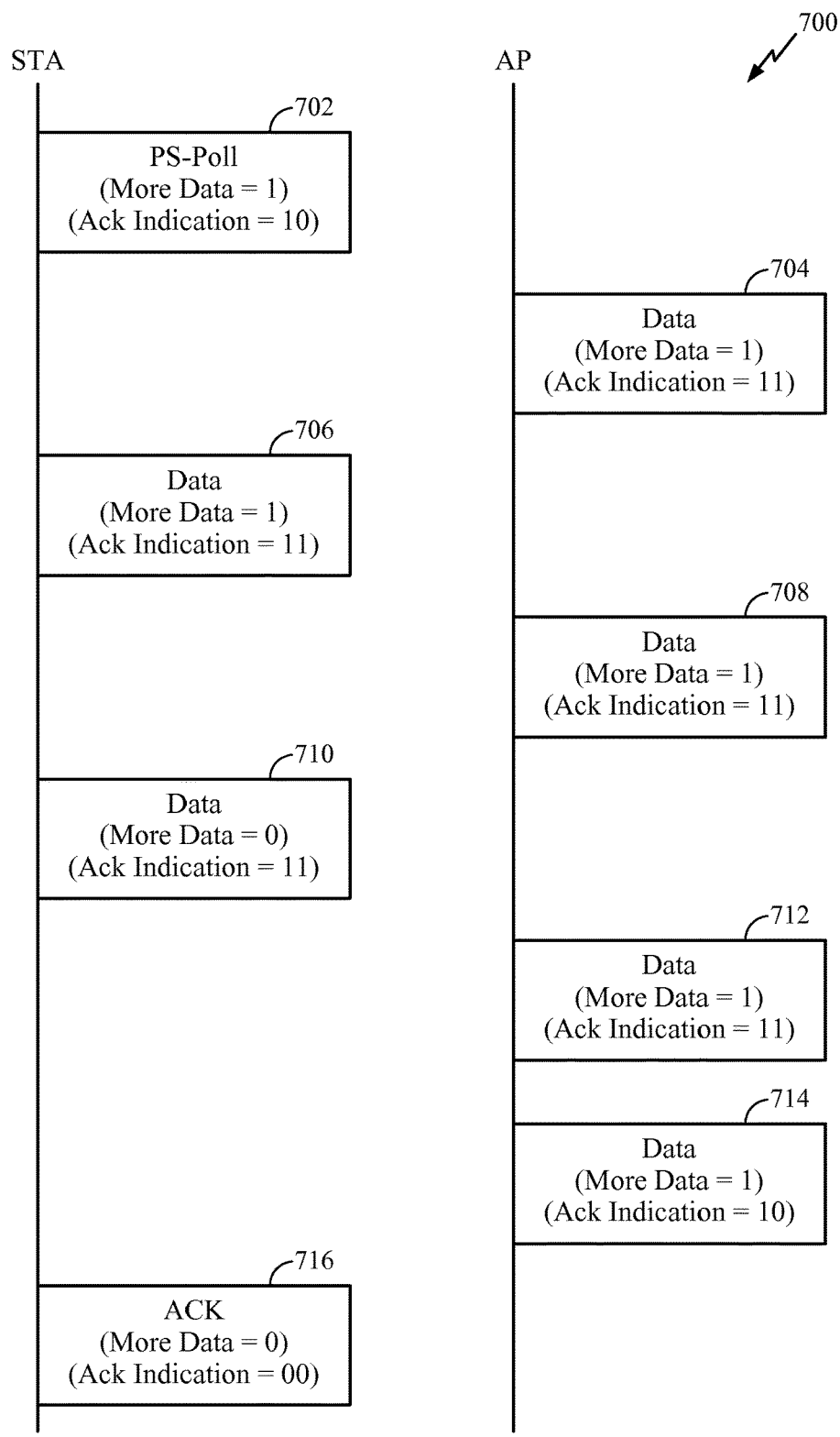
FIG. 7 illustrates an example speed frame, in accordance with aspects of the present disclosure.

FIG. 7 illustrates an example speed frame exchange 700 in accordance with the example rules provided herein. As shown in FIG. 7, at 704, a STA (e.g., a S1G AP) may initiate a SF exchange with a NDP Modified ACK frame that is sent as a response to a NDP PS-Poll frame received, at 702, from another STA. As shown in FIG. 7 The NDP Modified ACK frame may have the uplink data indication (UDI) field set to a nonzero value (e.g., a MoreData bit may set to 1). According to certain aspects, a response indication of long response may also be used for reverse direction protocol by setting the More PPDU/reverse direction grant (RDG) field in the QoS control field to 1 along with the long response indication in the PPDU eliciting a long response. According to certain aspects, the STA (e.g., S1G AP) that transmits this PPDU may be referred to as the SF initiator (also referred to as BDT initiator).

Next, one or more PPDUs (e.g., SF response burst) may be transmitted by the S1G STA addressed in the PPDUs transmitted by the SF Initiator. The S1G STA that transmits the SF response burst is generally referred to as the SF Responder (also referred to as BDT responder). For example, as shown in FIG. 7, at 706-714, the STA and AP (SF initiator) may exchange PPDUs until they do not have any more data to send. For example, at 706, the STA may send data to the AP with the MoreData bit set to indicate the STA has more data to send and with the ACK indication set to 11. At 708, the AP may respond with the same. At 710, the STA may send another PPDU to the AP but because the STA may not have anymore data to send the MoreData bit may be set to 0. At 712, the AP may send a PPDU to the STA, but since the AP may still have more data to send the MoreData bit may be set to 1 and then, at 714, the AP send its last data to the STA and the PPDU may have the MoreData bit set to 0.

According to certain aspects, the last (or only) PPDU of the SF response burst may contain any MPDU for which a response is desired that is an immediate (NDP) BlockAck or (NDP) Ack frame. If so, the SF initiator may transmit a PPDU containing an immediate BlockACK or ACK frame or an NDP ACK or NDP BlockACK as its final PPDU. According to certain aspects, the PPDU may have a Response Indication set to No Response if no immediate response is expected by the SF responder. Alternatively, the PPDU may have Response Indication set to NDP Response if an immediate NDP response is expected by the SF responder. Alternatively, the PPDU may have a Response Indication set to Normal Response if an immediate ACK or BlockACK frame is expected by the SF responder. Alternatively, the PPDU may have Response Indication set to Long Response if the PPDU initiates another SF exchange sequence.

According to certain aspects, the SF initiator may include multiple SF exchange sequences within a single transmission opportunity (TXOP) or service period (SP). According to certain aspects, a non-TXOP holder S1G STA may send an immediate response to an eliciting PPDU that had the MoreData field set to 1. The immediate response may have the Response Indication set to Long Response. Alternatively, if the eliciting PPDU includes the More Data field set to 0 in the frame most recently received from a peer S1G STA (e.g., STA that is not the TXOP holder), the SF responder may not set the Response Indication to Long Response in the immediate response. Instead, the SF Responder may set the Response Indication to No Response. A non-TXOP holder S1G (peer) STA sending an immediate response to an eliciting PPDU that had the MoreData field set to 0 and Response Indication set to Normal Response may send (NDP) ACK frame or BlockACK frame with the Response Indication to No Response.

According to certain aspects, after the SF initiator transmits an eliciting frame with Response Indication set to Long Response, the SF initiator may transmit a (NDP) contention free (CF)-End frame if the SF initiator has not received a solicited response before expiration of an ACKTimeout value.

According to certain aspects, TXOP may be truncated. For example, a TXOP hold may send a PPDU after receiving an ACK in the response of a Long Response indication. However, if there is not BU at the STAS, the STA may send CF-End. The responder to the Long Response may send an ACK that may not have the Response Indication set to No Response. Further, the Response Indication may not be set to Long Response unless the most recent received PPDU had the MoreData bit set to 1.

According to certain aspects, a non-AP STA may remain in the Awake state until the end of the current TXOP if the non-AP STA is the intended receiver of a frame with MoreData field set to 1 that is sent by the AP. According to certain aspects, the non-AP STA may transition to the Doze state once it is the intended receiver of a frame with MoreData field set to 0 that is sent by the AP.

Figure 8:
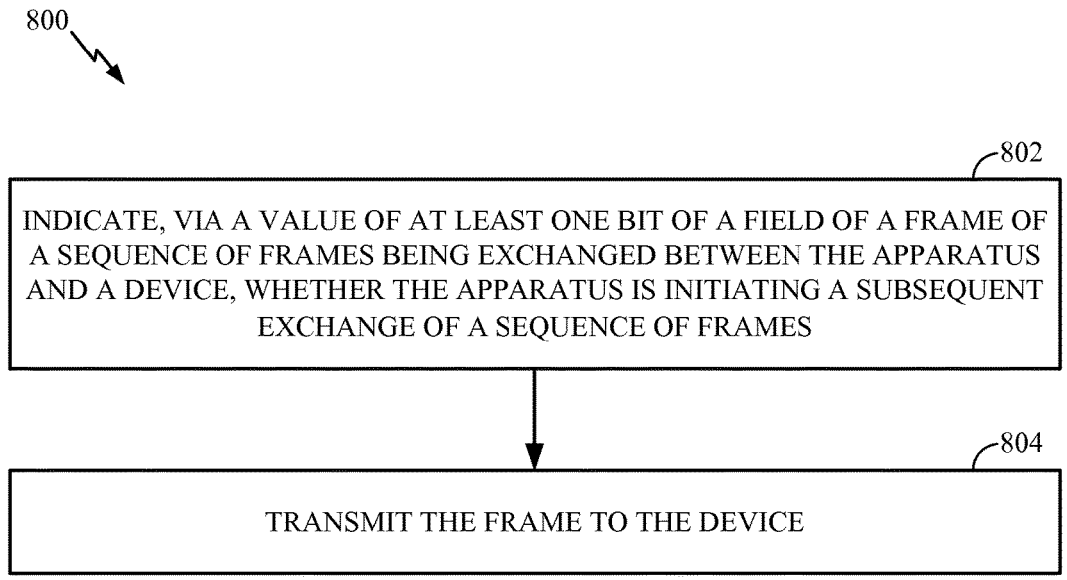
FIG. 8 illustrates a block diagram of example operations for wireless communications by a speed frame initiator, in accordance with certain aspects of the present disclosure.

FIG. 8 illustrates example operations 800 for wireless communications, according to certain aspects of the present disclosure. The operations 800 may be performed, for example, by an initiator (e.g., a STA or AP initiating a speed frame exchange). The operations 800 may begin, at 802, by indicating, via a value of at least one bit of a field (e.g., a response indication field of a frame of a sequence of frames being exchanged (e.g., part of a speed frame exchange) between the apparatus and a device (e.g., SF responder), whether the apparatus is initiating a subsequent exchange of a sequence of frames.

According to certain aspects, the value of the at least one bit of the response indication field may be set to a value corresponding to a Long Response to indicate the initiator is initiating a subsequent speed frame exchange. According to certain aspects, the at least one bit of the response indication field may be set to a value corresponding to a Long Response in response to a preceding frame having a MoreData field set to 1. According to certain aspects, the value of the at least one bit of the response indication field may be set to a value corresponding to a response type having a fixed duration to indicate the initiator is not initiating a subsequent speed frame exchange. According to certain aspects, the at least one bit of the response indication field may be set to a value corresponding to a response type having a deterministic duration in response to a preceding frame having a More Data field set to 0. According to certain aspects, the value of the at least one bit of the response indication field may be set to a value corresponding to at least one of a No Response, NDP Response, or Normal Response to indicate the apparatus is not initiating a subsequent speed frame exchange.

At 804, the initiator may transmit the frame to the device.

Figure 9:
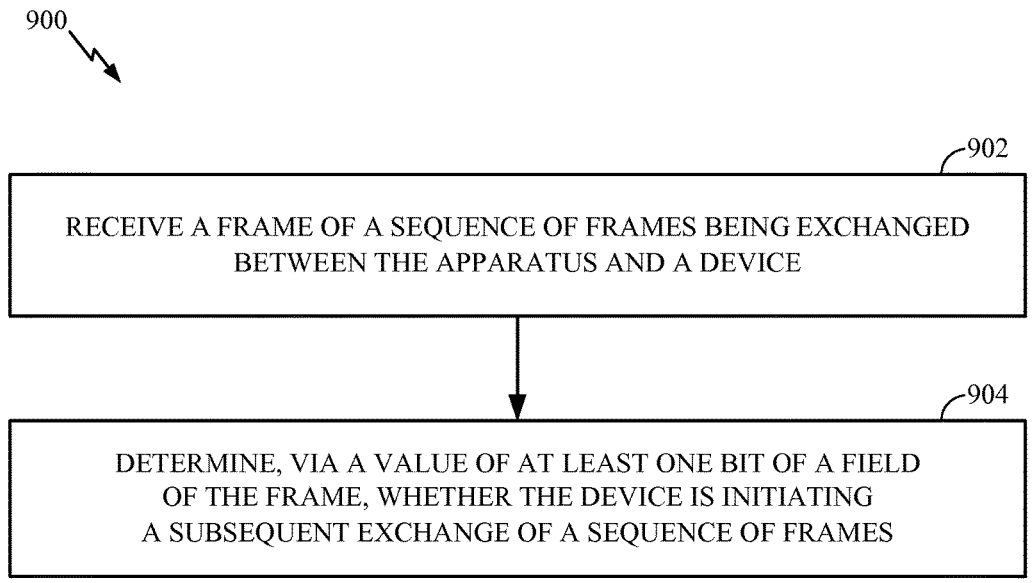
FIG. 9 illustrates a block diagram of example operations for wireless communications by a speed frame responder, in accordance with certain aspects of the present disclosure.

FIG. 9 illustrates example operations 900 that may be performed by a responder (e.g., a STA or AP responding to a device initiating a speed frame exchange). The operations 900 begin, at 902, by receiving a frame of a sequence of frames being exchanged (e.g., part of a speed frame exchange) between the apparatus and a device (e.g., an SF initiator).

At 904, the responder may determine, via a value of at least one bit of a field (e.g., response indication field) of the frame, whether the device is initiating a subsequent exchange of a sequence of frames.

In some cases, the value of the at least one bit may be a bit of the response indication field is set to a value corresponding to a Long Response to indicate the apparatus is initiating a subsequent speed frame exchange. In some cases, the value of the at least one bit of the response indication field is set to a value corresponding to a response type having a deterministic duration to indicate the apparatus is not initiating a subsequent speed frame exchange. For example, the value of the at least one bit of the response indication field may be set to a value corresponding to at least one of a No Response, NDP Response, or Normal Response to indicate the apparatus is not initiating a subsequent speed frame exchange.

Figure 8A:
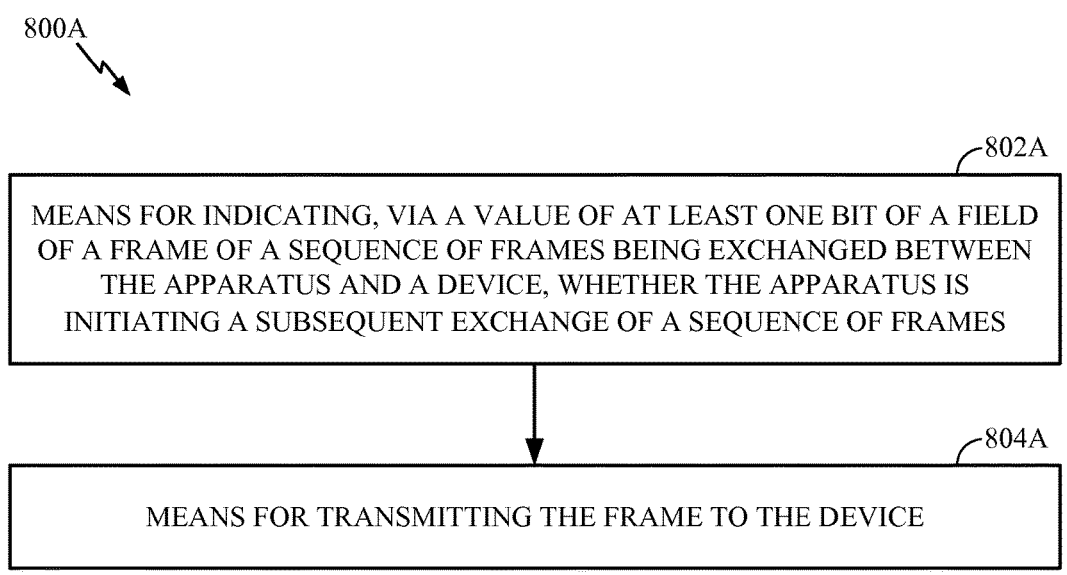
FIG. 8A illustrates example means capable of performing the operations shown in FIG. 8.
Figure 9A:
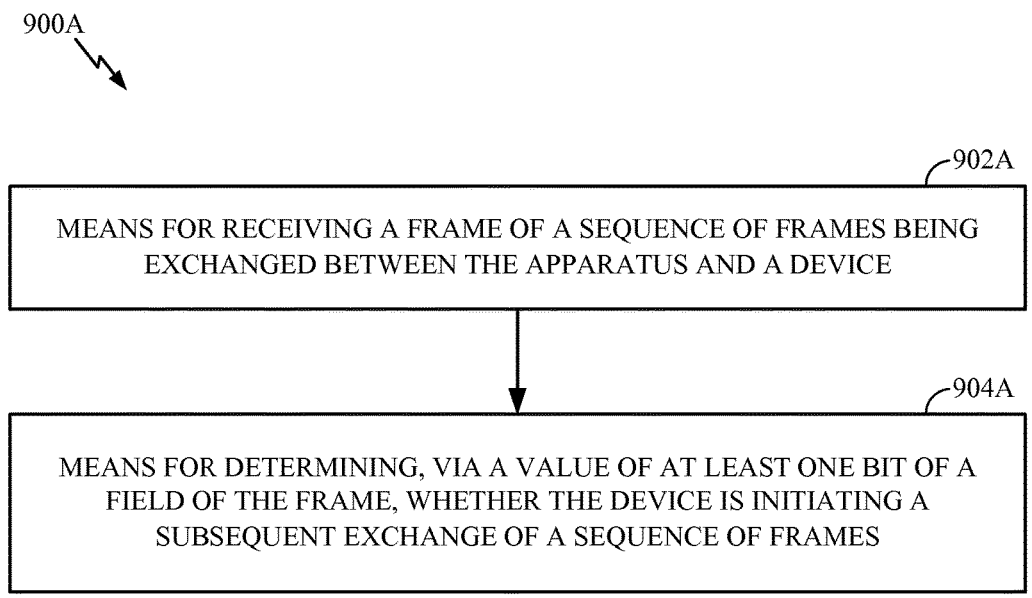
FIG. 9A illustrates example means capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 800 and 900 illustrated in FIGS. 8 and 9 correspond to means 800A and 900A illustrated in FIGS. 8A and 9A.

For example, means for transmitting may comprise a transmitter (e.g., the transceiver 222) and/or an antenna(s) 224 of the access point 110 illustrated in FIG. 2, a transmitter (e.g., the transceiver 254) and/or an antenna(s) 252 of the user terminal 120 illustrated in FIG. 2, or the transmitter 310 and/or antenna(s) 316 depicted in FIG. 3. Means for receiving may comprise a receiver (e.g., the transceiver 222) and/or an antenna(s) 224 of the access point 110 illustrated in FIG. 2, a receiver (e.g., the transceiver 254) and/or an antenna(s) 252 of the user terminal 120 illustrated in FIG. 2, or the receiver 312 and/or antenna(s) 316 depicted in FIG.

3. Means for processing, means for determining, and/or means for indicating may comprise a processing system, which may include one or more processors, such as the RX data processor 242, the TX data processor 210, and/or the controller 230 of the access point 110 illustrated in FIG. 2, the RX data processor 270, the TX data processor 288, and/or the controller 280 of the user terminal 120 illustrated in FIG. 2, or the processor 304 and/or the DSP 320 portrayed in FIG. 3.

According to certain aspects, such means may be implemented by processing systems configured to perform the corresponding functions by implementing various algorithms (e.g., in hardware or by executing software instructions). For example, an algorithm for setting one or more bits to indicate whether a subsequent speed frame exchange is to be initiated may take, as input, variables that indicate whether there is more data to be transmitted via such an exchange. Similarly, an algorithm for determining whether or not an initiating device is initiating a subsequent speed frame exchange may receive, as input, the one or more bits set to a value to indicate such.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material. For example, instructions for setting one or more bits to indicate whether a subsequent speed frame exchange is to be initiated may take, as input, variables that indicate whether there is more data to be transmitted via such an exchange. Similarly, instructions for determining whether or not an initiating device is initiating a subsequent speed frame exchange may receive, as input, the one or more bits set to a value to indicate such.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to indicate, via a value of at least one bit of a response indication field of a data frame of a first sequence of frames being exchanged as part of a speed frame exchange between the apparatus and a device, whether the apparatus is initiating a subsequent speed frame exchange of a second sequence of frames, wherein the processing system is configured to set the at least one bit of the response indication field to a value associated with a Long Response to indicate the apparatus is initiating the subsequent speed frame exchange;
a transmitter configured to transmit the data frame to the device; and
a receiver configured to receive at least one frame of the second sequence of frames from the device after transmission of the data frame, wherein:
the processing system is further configured to:
determine the at least one frame of the second sequence of frames is a last frame of a burst response if a value of at least one bit of a response indication field of the at least one frame of the second sequence of frames is associated with Immediate Response;
determine the at least one frame of the second sequence of frames is not the last frame of the burst response if the value of the at least one bit of the response indication field of the at least one frame of the second sequence of frames is associated with No Response; and
generate at least another frame of the second sequence of frames in response to the at least one frame of the second sequence of frames if it is determined that the at least one frame is the last frame of the burst response; and the transmitter is further configured to transmit the at least other frame of the second sequence of frames to the device if it is determined that the at least one frame is the last frame of the burst response.

2. The apparatus of claim 1, wherein:
the receiver is further configured to receive a frame having a More Data field set to 1; and
the processing system is further configured to set the at least one bit of the response indication field of the data frame to the value associated with Long Response after receiving the frame having the More Data field set to 1.

3. The apparatus of claim 1, wherein:
the processing system is further configured to set at least one bit of a response indication field of a data frame of the second sequence of frames to a value associated with a response type having a fixed duration to indicate the apparatus is not initiating a subsequent speed frame exchange of a third sequence of frames; and
the transmitter is further configured to transmit the data frame of the second sequence of frames to the device.

4. The apparatus of claim 3, wherein:
the receiver is further configured to receive a frame having a More Data field set to 0; and
the processing system is further configured to set the at least one bit of the response indication field of the data frame of the second sequence of frames to the value associated with the response type having the fixed duration after receiving the frame having the More Data field set to 0.

5. The apparatus of claim 1, wherein:
the processing system is further configured to set at least one bit of a response indication field of a data frame of the second sequence of frames to a value associated with at least one of a No Response, null data packet (NDP) Response, or Normal Response to indicate the apparatus is not initiating a subsequent speed frame exchange of a third sequence of frames; and
the transmitter is further configured to transmit the data frame of the second sequence of frames to the device.

6. An apparatus for wireless communications, comprising:
a receiver configured to receive a data frame of a first sequence of frames being exchanged as part of a speed frame exchange between the apparatus and a device;
a processing system configured to:
determine the device is initiating a subsequent speed frame exchange of a second sequence of frames if a value of at least one bit of a response indication field of the data frame is associated with a Long Response;
generate at least one frame, of the second sequence of frames, comprising a response indication field after determining the device is initiating the subsequent speed frame exchange; and
set at least one bit of the response indication field of the at least one frame of the second sequence of frames to a value associated with Immediate Response if the at least one frame of the second sequence of frames is a last frame of a burst response or to a value associated with No Response if the at least one frame of the second sequence of frames is not the last frame of the burst response; and
a transmitter configured to transmit the at least one frame of the second sequence of frames to the device.

7. A method for wireless communications by an apparatus, comprising:
indicating, via a value of at least one bit of a response indication field of a data frame of a first sequence of frames being exchanged as part of a speed frame exchange between the apparatus and a device, whether the apparatus is initiating a subsequent speed frame exchange of a second sequence of frames, wherein the indicating comprises setting the at least one bit of the response indication field to a value associated with a Long Response to indicate the apparatus is initiating the subsequent speed frame exchange;
transmitting the data frame to the device;
receiving at least one frame of the second sequence of frames from the device after transmitting the data frame;
determining the at least one frame of the second sequence of frames is a last frame of a burst response if a value of at least one bit of a response indication field of the at least one frame of the second sequence of frames is associated with Immediate Response;
determining the at least one frame of the second sequence of frames is not the last frame of the burst response if the value of the at least one bit of the response indication field of the at least one frame of the second sequence of frames is associated with No Response;
generating at least another frame of the second sequence of frames in response to the at least one frame of the second sequence of frames if it is determined that the at least one frame is the last frame of the burst response; and
transmitting the at least other frame of the second sequence of frames to the device if it is determined that the at least one frame is the last frame of the burst response.

8. The method of claim 7, wherein the at least one bit of the response indication field of the data frame is set to the value associated with Long Response after receiving a frame having a More Data field set to 1.

9. The method of claim 7, further comprising:
setting at least one bit of a response indication field of a data frame of the second sequence of frames to a value associated with a response type having a fixed duration to indicate the apparatus is not initiating a subsequent speed frame exchange of a third sequence of frames; and
transmitting the data frame of the second sequence of frames to the device.

10. The method of claim 9, wherein the at least one bit of the response indication field of the data frame of the second sequence of frames is set to the value associated with the response type having a fixed duration after receiving a frame having a More Data field set to 0.

11. The method of claim 7, further comprising:
setting at least one bit of a response indication field of a data frame of the second sequence of frames to a value associated with at least one of a No Response, null data packet (NDP) Response, or Normal Response to indicate the apparatus is not initiating a subsequent speed frame exchange of a third sequence of frames; and
transmitting the data frame of the second sequence of frames to the device.

12. A method for wireless communications by an apparatus, comprising:
receiving a data frame of a first sequence of frames being exchanged as part of a speed frame exchange between the apparatus and a device;

determining the device is initiating a subsequent speed frame exchange of a second sequence of frames if a value of at least one bit of a response indication field of the data frame is associated with a Long Response;

generating at least one frame, of the second sequence of frames, comprising a response indication field after determining the device is initiating the subsequent speed frame exchange;

setting at least one bit of the response indication field of the at least one frame of the second sequence of frames to a value associated with Immediate Response if the at least one frame of the second sequence of frames is a last frame of a burst response or to a value associated with No Response if the at least one frame of the second sequence of frames is not the last frame of the burst response; and transmitting the at least one frame of the second sequence of frames to the device.

13. An apparatus for wireless communications, comprising:

means for indicating, via a value of at least one bit of a response indication field of a data frame of a first sequence of frames being exchanged as part of a speed frame exchange between the apparatus and a device, whether the apparatus is initiating a subsequent speed frame exchange of a second sequence of frames, wherein the means for indicating comprises means for setting the at least one bit of the response indication field to a value associated with a Long Response to indicate the apparatus is initiating the subsequent speed frame exchange;

means for transmitting the data frame to the device;

means for receiving at least one frame of the second sequence of frames from the device after transmitting the data frame;

means for determining the at least one frame of the second sequence of frames is a last frame of a burst response if a value of at least one bit of a response indication field of the at least one frame of the second sequence of frames is associated with Immediate Response;

means for determining the at least one frame of the second sequence of frames is not the last frame of the burst response if the value of the at least one bit of the response indication field of the at least one frame of the second sequence of frames is associated with No Response;

means for generating at least another frame of the second sequence of frames in response to the at least one frame of the second sequence of frames if it is determined that the at least one frame is the last frame of the burst response; and means for transmitting the at least other frame of the second sequence of frames to the device if it is determined that the at least one frame is the last frame of the burst response.

14. The apparatus of claim 13, wherein the at least one bit of the response indication field of the data frame is set to the value associated with Long Response after receiving a frame having a More Data field set to 1.

15. The apparatus of claim 13, further comprising:

means for setting at least one bit of a response indication field of a data frame of the second sequence of frames to a value associated with a response type having a fixed duration to indicate the apparatus is not initiating a subsequent speed frame exchange of a third sequence of frames; and means for transmitting the data frame of the second sequence of frames to the device.

16. The apparatus of claim 15, wherein the at least one bit of the response indication field of the data frame of the second sequence of frames is set to the value associated with the response type having the fixed duration after receiving a frame having a More Data field set to 0.

17. The apparatus of claim 13, further comprising:

means for setting at least one bit of a response indication field of a data frame of the second sequence of frames to a value associated with at least one of a No Response, null data packet (NDP) Response, or Normal Response to indicate the apparatus is not initiating a subsequent speed frame exchange of a third sequence of frames; and means for transmitting the data frame of the second sequence of frames to the device.

18. An apparatus for wireless communications, comprising:

means for receiving a data frame of a first sequence of frames being exchanged as part of a speed frame exchange between the apparatus and a device;

means for determining the device is initiating a subsequent speed frame exchange of a second sequence of frames if a value of at least one bit of a response indication field of the data frame is associated with a Long Response;

means for generating at least one frame, of the second sequence of frames, comprising a response indication field after determining the device is initiating the subsequent speed frame exchange;

means for setting at least one bit of the response indication field of the at least one frame of the second sequence of frames to a value associated with Immediate Response if the at least one frame of the second sequence of frames is a last frame of a burst response or to a value associated with No Response if the at least one frame of the second sequence of frames is not the last frame of the burst response; and means for transmitting the at least one frame of the second sequence of frames to the device.

19. A non-transitory computer readable medium having instructions stored thereon for:

indicating, by an apparatus, via a value of at least one bit of a response indication field of a data frame of a first sequence of frames being exchanged as part of a speed frame exchange between the apparatus and a device, whether the apparatus is initiating a subsequent speed frame exchange of a second sequence of frames, wherein the indicating comprises setting the at least one bit of the response indication field to a value associated with a Long Response to indicate the apparatus is initiating the subsequent speed frame exchange;

transmitting, by the apparatus, the data frame to the device;

receiving, by the apparatus, at least one frame of the second sequence of frames from the device after transmitting the data frame;

determining, by the apparatus, the at least one frame of the second sequence of frames is a last frame of a burst response if a value of at least one bit of a response indication field of the at least one frame of the second sequence of frames is associated with Immediate Response;

determining, by the apparatus, the at least one frame of the second sequence of frames is not the last frame of the burst response if the value of the at least one bit of the response indication field of the at least one frame of the second sequence of frames is associated with No Response;

generating, by the apparatus, at least another frame of the second sequence of frames in response to the at least one frame of the second sequence of frames if it is determined that the at least one frame is the last frame of the burst response; and transmitting, by the apparatus, the at least other frame of the second sequence of frames to the device if it is determined that the at least one frame is the last frame of the burst response.

20. A non-transitory computer readable medium having instructions stored thereon for:

receiving, by an apparatus, a data frame of a first sequence of frames being exchanged as part of a speed frame exchange between the apparatus and a device;

determining, by the apparatus, the device is initiating a subsequent speed frame exchange of a second sequence of frames if a value of at least one bit of a response indication field of the data frame is associated with a Long Response;

generating, by the apparatus, at least one frame, of the second sequence of frames, comprising a response indication field after determining the device is initiating the subsequent speed frame exchange;

setting, by the apparatus, at least one bit of the response indication field of the at least one frame of the second sequence of frames to a value associated with Immediate Response if the at least one frame of the second sequence of frames is a last frame of a burst response or to a value associated with No Response if the at least one frame of the second sequence of frames is not the last frame of the burst response; and transmitting, by the apparatus, the at least one frame of the second sequence of frames to the device.

21. An access point (AP), comprising:

at least one antenna;

a processing system configured to indicate, via a value of at least one bit of a response indication field of a data frame of a first sequence of frames being exchanged as part of a speed frame exchange between the AP and a device, whether the AP is initiating a subsequent speed frame exchange of a second sequence of frames, wherein the processing system is configured to set the at least one bit of the response indication field to a value associated with a Long Response to indicate the AP is initiating the subsequent speed frame exchange;

a transmitter configured to transmit the data frame, via the at least one antenna, to the device; and a receiver configured to receive, via the at least one antenna, at least one frame of the second sequence of frames from the device after transmission of the data frame, wherein:

the processing system is further configured to:

determine the at least one frame of the second sequence of frames is a last frame of a burst response if a value of at least one bit of a response indication field of the at least one frame of the second sequence of frames is associated with Immediate Response;

determine the at least one frame of the second sequence of frames is not the last frame of the burst response if the value of the at least one bit of the response indication field of the at least one frame of the second sequence of frames is associated with No Response; and generate at least another frame of the second sequence of frames in response to the at least one frame of the second sequence of frames if it is determined that the at least one frame is the last frame of the burst response; and the transmitter is further configured to transmit, via the at least one antenna, the at least other frame of the second sequence of frames to the device if it is determined that the at least one frame is the last frame of the burst response.

22. A station (STA), comprising:

at least one antenna;

a receiver configured to receive, via the at least one antenna, a data frame of a first sequence of frames being exchanged as part of a speed frame exchange between the STA and a device;

a processing system configured to:

determine the device is initiating a subsequent speed frame exchange of a second sequence of frames if a value of at least one bit of a response indication field of the data frame is associated with a Long Response;

generate at least one frame, of the second sequence of frames, comprising a response indication field after determining the device is initiating the subsequent speed frame exchange; and set at least one bit of the response indication field of the at least one frame of the second sequence of frames to a value associated with Immediate Response if the at least one frame of the second sequence of frames is a last frame of a burst response or to a value associated with No Response if the at least one frame of the second sequence of frames is not the last frame of the burst response; and a transmitter configured to transmit, via the at least one antenna, the at least one frame of the second sequence of frames to the device.

* * * * *